United States Patent [19]

Laz et al.

[11] 3,984,808
[45] Oct. 5, 1976

[54] PNEUMATIC TIRE TROUBLE INDICATOR WITH BALL/SOCKET SWITCH

[75] Inventors: Robert Laz; George Laz, both of Snohomish, Wash.

[73] Assignee: Laz Switch Company, Inc., Snohomish, Wash.

[22] Filed: Mar. 7, 1975

[21] Appl. No.: 556,261

[52] U.S. Cl. .............................. 340/58; 200/61.23; 200/277
[51] Int. Cl.² ...................... B60C 23/06; H01H 1/16
[58] Field of Search ............ 340/58, 61; 200/61.23, 200/61.24, 61.41, 61.42, 61.44, DIG. 10, DIG. 29, 61.48, 61.51, 277, 8 R

[56] References Cited
UNITED STATES PATENTS

| | | | |
|---|---|---|---|
| 1,666,338 | 4/1928 | Meuer | 200/68 |
| 2,191,205 | 2/1940 | Rogers | 200/58 |
| 2,214,685 | 9/1940 | Stone, Jr. | 340/61 |
| 2,259,614 | 10/1941 | Chang | 340/61 |
| 2,457,161 | 12/1948 | Laidlaw | 200/61.23 |
| 2,773,953 | 12/1956 | Lawick | 200/61.51 |
| 2,847,527 | 8/1958 | Wolters | 200/61.44 |
| 3,055,998 | 9/1962 | Collins | 200/61.23 |
| 3,238,316 | 3/1966 | Voss | 200/8 R |

FOREIGN PATENTS OR APPLICATIONS 781,942    5/1935    France .......................... 200/61.44

*Primary Examiner*—John W. Caldwell
*Assistant Examiner*—Joseph E. Nowicki
*Attorney, Agent, or Firm*—Christensen, O'Connor, Garrison & Havelka

[57] ABSTRACT

A ball/socket switch having a sensing arm affixed to the ball and mounted in relation to a pneumatic tire such that deflation of the tire causes the sensing arm to move the ball in the socket. Preferably, both the ball and the socket are injection molded of glass-filled nylon or ABS plastic. First and second electrical conductors, one affixed to the ball and the other affixed to the socket are normally maintained out of contact by a spring loaded ball detent mechanism. When the deflation of a pneumatic tire causes the ball to move in the socket by an adequate amount, the electrical conductors contact one another. A suitable power source and indicator connected in series with the electrical conductors results in a visual and/or audio indication of conductor contact and, thus, a visual and/or audio indication that the associated pneumatic tire is deflated.

10 Claims, 4 Drawing Figures

U.S. Patent  Oct. 5, 1976  3,984,808
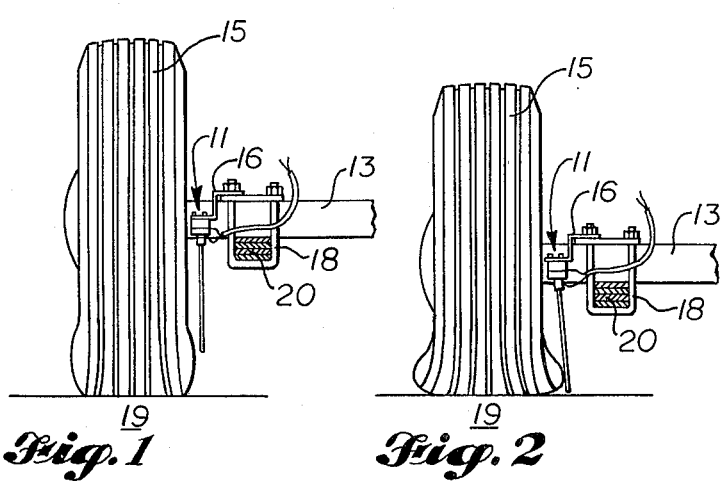
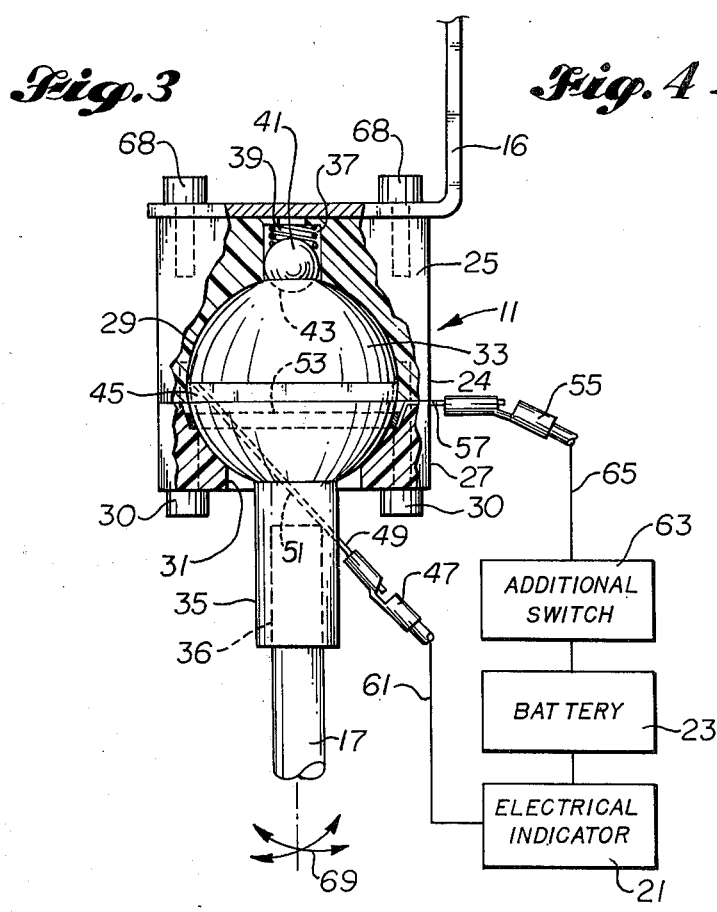
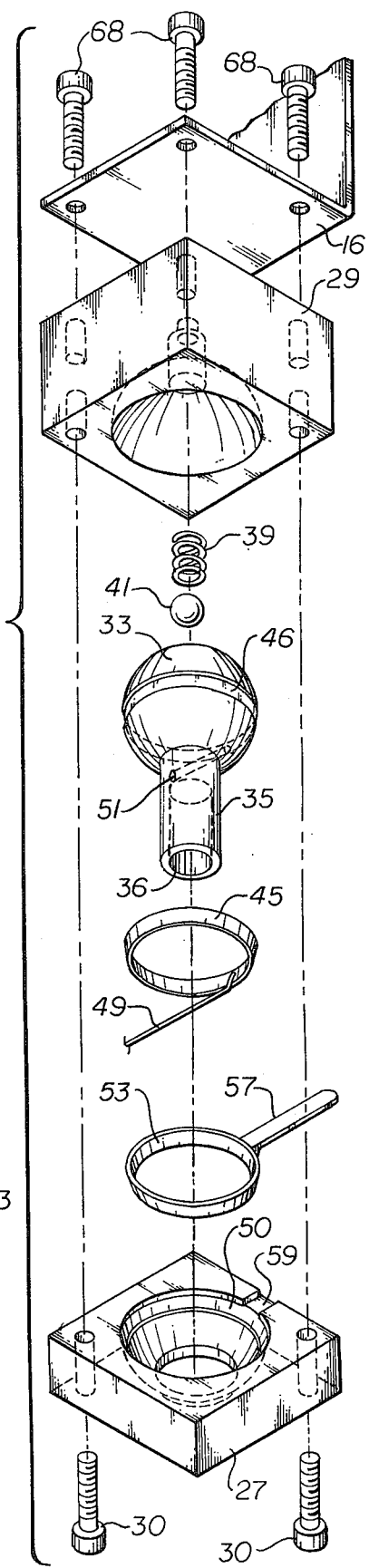

PNEUMATIC TIRE TROUBLE INDICATOR WITH BALL/SOCKET SWITCH

BACKGROUND OF THE INVENTION

This invention is directed to indicators and more particularly to devices for indicating that a pneumatic structure (tire) is changing shape (deflating).

As will be better appreciated from the following description of a preferred embodiment, the present invention is primarily suitable for use in combination with trailers towed by automobiles, light trucks and the like, and was developed in that environment. However, it also will be appreciated that the invention can be utilized in other environments where it is desired to reliably sense when a pneumatic structure changes from its normal configuration.

Ever since the advent of the automobile, trailers have been utilized to move certain cargo such as homes, boats, etc. As the towing power of the automobile has increased, so has the size and weight of the cargo carried by trailers increased. In recent years, automobiles have been used to tow boat trailers, carrying boats in excess of 20 feet and weighing up to several tons, for example. Large, modern towable house trailers may be of equal size and weight. While an automobile can readily pull trailers carrying objects of this size and weight, certain problems exist that have become more acute as the size and weight of the cargo being carried by the trailer have increased.

More specifically, most trailers include a frame and one or more axles on which pneumatic tires are mounted. Pneumatic tires have the disadvantage that they deflate and go "flat" when they are punctured, either by some external object (e.g., nail) or because of a blowout. While a flat tire is usually only mildly inconvenient when a trailer is stationary, it may become a hazard to both life and property when the trailer is moving. The hazard may be extremely acute if the trailer is carrying a large and heavy cargo, such as a large boat, for example. A deflated pneumatic tire is extremely hazardous in such a case because the mass of the cargo will tend to gyrate back and forth as a result of the instability created by the deflated tire. These gyrations often tend to build in amplitude and can result in not only the destruction of the trailer, but also the destruction of the towing vehicle and, thus, lead to the injury or death of the occupants of the towing vehicle. Consequently, it is desirable to provide a pneumatic tire trouble indicator that indicates to the occupants of the towing vehicle that a pneumatic tire of the trailer has become, or is being, deflated.

Pneumatic tire trouble indicators have been proposed by the prior art. However, they have not been generally commercially accepted because of certain unresolved disadvantages. An example of a prior art tire trouble indicator is described in U.S. Pat. No. 2,457,161 issued to W. C. Laidlaw for "Tire Deflation Switch" on Dec. 28, 1948. The major problem with devices of the type described in this patent relates to their reliability. More specifically, the Laidlaw patent describes a device wherein a rod, located adjacent to a tire, is moved when it contacts the ground. This action occurs when the tire deflates. Movement of the rod causes metal-to-metal contact and current flow through an indicator to occur. One of the major disadvantages to this structure is that the entire switch assembly, including the metal contact elements, are exposed to the atmosphere. Because they are exposed to the atmosphere, they are readily corroded and, thus, rapidly become unreliable. Further, because the exposed switch assembly is mounted near the tire whose inflation it is designed to sense, the assembly, including the metal contact elements are exposed to the dirt, oil, and water sprayed around by tire rotation. These items tend to coat the metal contacts with a non-conductive coating even before they become corroded.

Therefore, it is an object of this invention to provide a new and improved pneumatic tire trouble indicator.

It is a further object of this invention to provide a pneumatic tire trouble indicator that includes a tire deflation sensing switch that is reliable and, suitable for use over extended periods of time without requiring cleaning and maintenance.

It is another object of this invention to provide a new and improved tire deflation sensing switch suitable for sensing when a pneumatic tire, or other pneumatic structure, changes from its normal shape and closing electrical switch contacts when a shape change is sensed.

Another disadvantage of pneumatic tire sensing switches of the type disclosed in the Laidlaw patent relates to their ability to sense in only one plane. In the case of Laidlaw, the sensing plane lies parallel to the plane defined by the associated tire. Single plane sensing has a number of disadvantages. First, it requires that the switch be relatively precisely aligned. Second, it only allows for sensing of one parameter. In the case of Laidlow, the single parameter sensed is the sensing element sliding on the ground. It is more desirable to sense several parameters occurring in different planes. For example, it is desirable to sense the change in the thickness of the lower sidewall of the tire that occurs as it goes flat, as well as its decrease in height.

Therefore, it is an object of this invention to provide a new and improved pneumatic tire deflation switch including a movable switch element that is movable in more than one plane.

SUMMARY OF THE INVENTION

In accordance with principles of this invention, an indicator for indicating when a pneumatic structure changes from its normal shape is provided. More specifically, in accordance with principles of this invention, a pneumatic tire trouble indicator suitable for indicating when a pneumatic tire changes from its normal inflated state to a deflated, or partially deflated, state is provided. The invention is useful regardless of whether or not the tire is stationary or moving.

In accordance with further principles of this invention, the pneumatic tire trouble indicator comprises a ball/socket switch that includes a two-piece housing and a movable spherical element or ball mounted in a spherical socket formed in the housing. The ball includes an outwardly extending arm that, when moved from a normal position, causes a pair of electrical switch conductors to meet.

In accordance with other principles of this invention, one electrical conductor is mounted on the periphery of the ball and the other is mounted about the periphery of the spherical socket. Preferably, both conductors are ring-shaped and lie in spaced parallel planes when the ball is in its normal position. In addition, a detent mechanism, adapted to maintain the ball in its normal position, is included.

In accordance with still further principles of this invention, one switch conductor is connected to the other via a power source and an audio and/or visual electrically activated indicator. If desired, an additional control switch can be connected in this series circuit.

In accordance with yet other principles of this invention, a replaceable extension is affixed to the outwardly extending arm of the ball of the ball/socket switch. Preferably, the extension is a wooden dowel that is readily replaceable if broken by flying objects (e.g. rocks). Further, preferably, both the ball and the housing are injection molded of glass-filled nylon or ABS plastic, and include indentations within which the ring-shaped metal conductors lie. Also, preferably, the detent is a spring loaded ball detent mechanism mounted so as to be co-axial with the outwardly extending arm of the ball when the ball is in its normal position.

In operation, the ball/socket switch is affixed to the axle of the pneumatic tire whose deflation is to be sensed. The ball/socket switch is mounted such that the arm extension projects downwardly and the tip thereof is slightly spaced from the inner sidewall of the pneumatic tire. The lower tip is also located slightly above the ground on which the tire rests. When the tire starts to deflate, its lower sidewalls bulge outwardly. The inner sidewall bulge impinges on the arm extension, causing the switch ball to rotate in the spherical socket, against the pressure created by the detent. The ball rotation, if the tire bulges far enough, brings the electrical conductors of the ball/socket switch into contact, causing an electrical circuit to be completed and the audio and/or visual indicator to be energized. As a backup to tire bulge causing arm movement, impingement of the arm on the ground, as tire height decreases due to deflation, will also cause movement of the arm and the ball, and finally conductor contact and an audio/visual indication.

It will be appreciated from the foregoing summary that the invention provides a new and improved sensor for sensing the deflation of a pneumatic structure, such as a pneumatic tire. The invention may be used in a powered vehicle, such as an automobile; however, it is primarily adapted for use with trailers, such as boat trailers, house trailers, commercial truck trailers and the like. The invention overcomes the major disadvantage of prior art devices of the type disclosed in U.S. Pat. No. 2,457,161, referred to above, because the electrical conductors of the switch are entirely enclosed and, thus, not subject to atmospheric deterioration and/or coating by dirt, oil, dust, water, and the like. The invention accomplishes this result with a structure that is even less complicated than prior art structures. Because the switch is enclosed, the invention is suitable for use over extended periods of time without cleaning and maintenance. Further, because the switch operates in more than one plane, this further disadvantage of prior art devices is also overcome.

BRIEF DESCRIPTION OF THE DRAWINGS

The foregoing objects and many of the attendant advantages of this invention will become more readily appreciated as the same becomes better understood by reference to the following detailed description and taken in conjunction with the accompanying drawings wherein:

FIG. 1 is a schematic elevational view illustrating a structure formed in accordance with the invention mounted on the axle of a trailer so as to sense when a pneumatic tire deflates, the tire being illustrated as inflated;

FIG. 2 is a schematic elevational view illustrating a structure formed in accordance with the invention mounted on the axle of a trailer so as to sense when a pneumatic tire deflates, the tire being illustrated as deflated;

FIG. 3 is a combined electrical/mechanical diagram illustrating a preferred embodiment of the invention; and, FIG. 4 is an exploded perspective view illustrating a preferred embodiment of a ball/socket switch formed in accordance with the invention.

DESCRIPTION OF THE PREFERRED EMBODIMENT

FIGS. 1 and 2 illustrate a ball/socket switch 11 formed in accordance with the invention attached to the axle 13 of a trailer (not shown). Rotatably attached to the outer end of the axle 13 is a pneumatic tire 15. The ball/socket switch is attached to the axle 13 by a Z-shaped bracket 16 affixed to one of the U bolts 18 that attach the springs 20 to the axle 13. Attached to the ball/socket switch 11, as better described hereinafter, is a sensing extension arm 17. The sensing extension arm 17 projects vertically downwardly. The arm/socket switch 11 is positioned such that, when the pneumatic tire 15 is inflated to its normal pressure level, as illustrated in FIG. 1, the lower tip of the extension arm 17 is spaced from (or just touches) the inner sidewall of the pneumatic tire 15. In addition, the lower tip of the extension arm 17 is spaced above the ground 19 on which the tire 15 rests.

As illustrated in FIG. 2, when the tire 15 loses air pressure, i.e., becomes partially of fully deflated, its lower sidewall bulges out, presses against the sensing extension arm 17 and moves the arm from its normal vertical position. More specifically, as will be appreciated by persons familiar with pneumatic tires, when a pneumatic tire loses air pressure and deflates, the weight of the structure supported by the tire causes the lower sidewall of the tire to bulge. This bulging action causes the extension arm 17 to move from its normal position, illustrated in FIG. 1, toward the position illustrated in FIG. 2. Thus, the sensing extension arm 17 "senses" when the pneumatic tire deflates. The deflation is sensed regardless of whether the tire is stationary or moving. As a backup to this primary tire deflation sensing operation, the sensing extension arm 17 also is moved out of its normal vertical position when the tire deflates to a level below the level where the lower tip of the extension arm 17 impinges on the ground 19. This impingement moves the extension arm into or out of the plane defined by the drawing. A combination of the two directions of extension arm movement moves the arm at some angle relative to both planes.

FIGS. 3 and 4 illustrate a ball/socket switch 11 formed in accordance with the invention. FIG. 2 illustrates the ball/socket switch 11 connected in an electrical circuit for energizing an electrical indicator 21 connected to a battery 23. The battery 23 may be the battery of the vehicle towing the trailer. The electrical indicator, which may be an audio, visual or audio/visual indicator, is mounted in the vehicle for viewing and/or hearing by the operator.

The ball/socket switch 11 mainly comprises socket 24 and a ball 33. The socket is a two-piece housing, comprising a main socket element 25 and a cover socket element 27, adapted to house the ball 33. The elements are assemblable together so as to define a spherical socket 29 within which the ball 33 is mounted. More specifically, the main socket element 25 defines one-half of a spherical aperture and the cover socket element 27 defines a portion of a second one-half of a spherical aperture. When the socket elements are appropriately assembled together the two spherical aperture halves combine to define the spherical socket 29. A cylindrical access opening 31 provides access to the spherical socket 29, through the cover socket element 27.

The ball 33 includes an arm 35 that extends outwardly through the cylindrical access opening 31. Extending outwardly from the arm 35 is the sensing extension arm 17. Preferably, as illustrated, the sensing extension arm 17 is formed of wood so that it creates a "weak" link in the sensing system that will be broken if hit by a flying rock having an adequate amount of destructive energy. Yet, this weak link is readily replaceable. It may be formed of a ¼ inch diameter wood dowel held in a suitable co-axial aperture 36 formed in the arm 35 of the ball 33.

Preferably, the socket (both elements) and the ball (including its arm) are injection molded of glass-filled nylon, which only shrinks by 5/1000 inch when compared to nylon alone, which shrinks by 20-30/1000 inch. It will be appreciated that while this material is preferred, other suitable materials may also be used.

A cylindrical aperture 37 extends inwardly into the main socket element 25 from the spherical socket 29. Preferably, the cylindrical aperture 37 is co-axial with the cylindrical access opening 31 formed in the cover socket element 27. Mounted in the cylindrical aperture 37 is a detent mechanism comprising a coil spring 39 and a ball 41. The coil spring 39 presses the detent ball 41 into a receiving recess 43 formed in the switch ball 33 at an appropriate location. The detent mechanism provides a force that tends to maintain the ball 33 of the ball/socket switch 11 in a particular position. This position is the normal position illustrated in FIG. 1 and heretofore described, i.e., it is the position at which the sensing extension arm is slight spaced from the inner sidewall of an associated tire when the ball/socket switch is mounted in a sensing position.

Mounted in an aperture 46 formed in the outer surface of the switch ball 33 is a first cylindrical electrical conductor 45. The first cylindrical electrical conductor 45 is electrically connected to a first externally located electrical connector 47 via a first wire 49 located in an aperture 51 formed in the ball 33. The aperture 51 extends transversely through the arm 35 and a portion of the ball 33. A second cylindrical electrical conductor 53 is mounted in a suitable aperture 50 formed in the surface of the spherical socket 29. In the illustrated socket the aperture 50 is formed in the cover element 27. It is pointed out here that, when conductor contact is made as the ball is rotated in the manner hereinafter described, the detent mechanism creates a force that results in positive conductor contact.

The conductor apertures are located such that when the ball 33 is in its normal position whereat the detent ball 41 lies in its recess 43, the first and second cylindrical electrical conductors 45 and 43 lie parallel to one another and are separated by some distance A, which may be 20/1000 of an inch, for example.

The second cylindrical electrical conductor 53 is connected to a second externally located electrical connector 55 by a second wire or flat conductor 57 located in an aperture 59 also formed in the cover element 27. The first electrical connector 47 is connected to the electrical indicator 41 by a first connecting wire 61. The second electrical connector 55 is connected to the battery 23 via a second connecting wire 65. An additional control switch 63, if desired, adapted to control current flow through the indicator, may be connected in series with either of the connecting wires. Such a switch is illustrated as being connected in series with the second connecting wire 65, i.e., between the second connector 55 and the battery 23.

Cap screws 68 are provided for attaching the main socket element 25 to the Z-shaped bracket 16.

It will be appreciated that the ball of the ball/socket switch illustrated in FIGS. 3 and 4 is rotatable in a multitude of planes, as illustrated by the arrows 69. Thus, is does not have to be exactly aligned when affixed to an axle, as illustrated of FIGS. 1 and 2. After the sensing extension arm 17 has been moved through a suitable arc, the arm 35 rotates the ball to a position whereat the first and second electrical conductors are brought into electrical contact. Contact between these electrical conductors closes a current path that allows current to flow from the battery through the electrical indicator 21, creating an audio, visual or audio/visual indication. Preferably, the cylindrical conductors are formed of copper; however they can be formed of other suitable materials. As noted above, preferably, the electrical indicator 21 is mounted in the vehicle towing the trailer so that it can be viewed or heard by the operator so that, if a tire is deflated while the trailer is moving, the operator is immediately alerted and allowed the maximum amount of time to bring the vehicle and trailer to a stop.

While the foregoing description has described a preferred embodiment of the invention, it will be appreciated that various changes can be made therein without departing from the spirit and scope of the invention, as set forth in the appended claims. Hence, the invention can be practiced otherwise than as specifically described herein.

The embodiments of the invention in which an exclusive property or privilege is claimed are defined as follows:

1. In a pneumatic tire trouble indicator comprising a tire deflation sensing switch connected to complete an electrical circuit between a power source and an electrical indicator, the improvement comprising an improved tire deflation sensing switch, said improved tire deflation sensing switch comprising:
   a socket housing formed of a nonelectrically conductive material, said socket housing defining a spherical socket;
   a switch ball formed of a nonelectrically conductive material, said switch ball mounted in said spherical socket so as to be rotatable therein;
   a first cylindrical electrical conductor mounted in a predetermined region of said spherical socket so as to impinge on said switch ball;
   A second cylindrical electrical conductor mounted in a predetermined region of said switch ball so as to impinge on the wall of said spherical socket;
   said first and second cylindrical electrical conductors being positioned such that they lie in parallel spaced planes and are out of contact with one another when said switch ball is in a predetermined normal position in said spherical socket and are brought into contact with one another when said switch ball is moved to other positions in said spherical socket; and, a sensing arm affixed to said switch ball, said sensing arm adapted to be impinged upon by the bulging of the side wall of a pneumatic tire when said improved tire deflation sensing switch is mounted in a position such that said sensing arm is located adjacent the bulging region of said side wall of said pneumatic tire.

2. An improved pneumatic tire trouble indicator as claimed in claim 1 including a detent mechanism mounted in said socket housing for maintaining said switch ball in said predetermined normal position until a suitable force is applied to said sensing arm by said bulging sidewall of said pneumatic tire.

3. An improved pneumatic tire trouble indicator as claimed in claim 2 wherein said detent mechanism is a spring loaded ball detent mechanism and wherein said switch ball includes a recess adapted to receive the detent ball of said spring loaded ball detent mechanism when said switch ball is in said predetermined normal position.

4. An improved pneumatic tire trouble indicator as claimed in claim 1 wherein said socket housing is formed of a main socket element and a cover socket element, said main and cover socket elements being assemblable together in a predetermined manner such that said spherical socket is defined by said main and cover socket elements, said cover element including a cylindrical aperture allowing access to said spherical socket, and wherein said switch ball includes an arm passing through said cylindrical aperture, said sensing arm being attached to said arm of said switch ball.

5. An improved pneumatic tire trouble indicator as claimed in claim 1 wherein said sensing arm is formed of a breakable material.

6. An improved pneumatic tire trouble indicator as claimed in claim 1 wherein said socket housing and said ball are injection molded of glass-filled nylon.

7. A sensing switch comprising:
a socket housing formed of a nonelectrically conductive material, said socket housing defining a spherical socket;
a switch ball formed of a nonelectrically conductive material, said switch ball mounted in said spherical socket so as to be rotatable therein;
a first cylindrical electrical conductor mounted in a predetermined region of said spherical socket so as to impinge on said switch ball;
a second cylindrical electrical conductor mounted in a predetermined region of said switch ball so as to impinge on the wall of said spherical socket;
said first and second cylindrical electrical conductors being positioned such that they lie in parallel spaced planes and are out of contact with one another when said switch ball is in a predetermined normal position in said spherical socket and are brought into contact with one another when said ball is moved to other positions in said spherical socket;
a sensing arm affixed to said switch ball so as to extend outwardly therefrom; and,
a detent mechanism mounted in said socket housing for maintaining said switch ball in said predetermined normal position until a suitable force is applied to said sensing arm.

8. A sensing switch as claimed in claim 7 wherein said detent mechanism is a spring loaded ball detent mechanism and wherein said switch ball includes a recess adapted to receive the detent ball of said spring loaded ball detent mechanism when said switch ball is in said predetermined normal position.

9. A sensing switch as claimed in claim 7 wherein said socket housing is formed of a main socket element and a cover socket element, said main and cover socket elements being assemblable together in a predetermined manner such that said spherical socket is defined by said main and cover socket elements, said cover element including a cylindrical aperture allowing access to said spherical socket, and wherein said switch ball includes an arm passing through said cylindrical aperture, said sensing arm being attached to said arm of said switch ball.

10. A sensing switch as claimed in claim 7 wherein:
said sensing arm is formed of a breakable material; and,
said socket housing and said ball are injection molded of glass-filled nylon.

* * * * *